US008886798B2

(12) United States Patent
Richards

(10) Patent No.: US 8,886,798 B2
(45) Date of Patent: Nov. 11, 2014

(54) GROUP MONITORING SYSTEM AND METHOD

(75) Inventor: Mark Douglas Richards, Sydney (AU)

(73) Assignee: Vardr Pty Ltd, Queensland (AT)

( * ) Notice: Subject to any disclaimer, the term of this patent is extended or adjusted under 35 U.S.C. 154(b) by 171 days.

(21) Appl. No.: 13/296,342

(22) Filed: Nov. 15, 2011

(65) Prior Publication Data

US 2012/0124203 A1    May 17, 2012

(30) Foreign Application Priority Data

Nov. 15, 2010 (AU) .............................. 2010905070

(51) Int. Cl.

| | |
|---|---|
| *G06F 15/173* | (2006.01) |
| *H04W 4/08* | (2009.01) |
| *H04L 12/24* | (2006.01) |
| *H04N 21/258* | (2011.01) |
| *H04N 21/45* | (2011.01) |
| *H04L 29/08* | (2006.01) |

(52) U.S. Cl.
CPC ............... *H04W 4/08* (2013.01); *H04L 67/025* (2013.01); *H04L 41/06* (2013.01); *H04L 29/08099* (2013.01); *H04L 41/0604* (2013.01); *H04N 21/258* (2013.01); *H04N 21/4516* (2013.01); *H04L 41/509* (2013.01)
USPC ............................ 709/224; 340/1.1; 340/16.1

(58) Field of Classification Search
CPC ..... H04W 4/08; H04L 41/0604; H04L 41/06; H04L 29/08099; H04L 67/025; H04L 41/509; H04N 21/258; H04N 21/4516
USPC ........................................................ 709/224
See application file for complete search history.

(56) References Cited

U.S. PATENT DOCUMENTS

| | | | |
|---|---|---|---|
| 7,680,947 B2 | 3/2010 | Nicholl et al. | |
| 2004/0136388 A1* | 7/2004 | Schaff ........................... | 370/401 |
| 2004/0260785 A1 | 12/2004 | Leong Kong et al. | |
| 2005/0132414 A1* | 6/2005 | Bentley et al. ................ | 725/105 |
| 2007/0106419 A1* | 5/2007 | Rachamadugu .............. | 700/188 |
| 2007/0211866 A1 | 9/2007 | Sink | |
| 2007/0214264 A1 | 9/2007 | Koister | |
| 2008/0108339 A1 | 5/2008 | Shaffer et al. | |
| 2008/0303903 A1 | 12/2008 | Bentley et al. | |
| 2009/0015672 A1 | 1/2009 | Clapp | |
| 2009/0204689 A1 | 8/2009 | Chipman et al. | |
| 2009/0292549 A1* | 11/2009 | Ma et al. ........................... | 705/1 |
| 2010/0245567 A1 | 9/2010 | Krahnstoever et al. | |
| 2011/0013018 A1 | 1/2011 | Leblond | |
| 2011/0058034 A1 | 3/2011 | Grass | |
| 2011/0093923 A1 | 4/2011 | Yau et al. | |

(Continued)

FOREIGN PATENT DOCUMENTS

| | | | | |
|---|---|---|---|---|
| EP | 1246149 A1 | 10/2002 | | |
| EP | 2107537 A1 * | 10/2009 | ........... | G08B 13/196 |

(Continued)

*Primary Examiner* — Jude Jean Gilles
*Assistant Examiner* — Jaren M Means
(74) *Attorney, Agent, or Firm* — Blakely Sokoloff Taylor & Zafman LLP

(57) ABSTRACT

An internet based social networking system, the system including: a number of video sensors monitoring a specified environment and streaming video into the system; a series of system users collectively monitoring the video streams and analyzing events generated in relation to the video stream; and a reporting system for reporting actions taken by the system users among the system users.

20 Claims, 17 Drawing Sheets

(56) References Cited

U.S. PATENT DOCUMENTS

| | | |
|---|---|---|
| 2011/0111786 A1 | 5/2011 | Rao |
| 2011/0141277 A1* | 6/2011 | Midkiff ........................ 348/143 |
| 2011/0211069 A1 | 9/2011 | Sybesma |
| 2011/0225238 A1 | 9/2011 | Shaffer et al. |

FOREIGN PATENT DOCUMENTS

| | | |
|---|---|---|
| WO | 03036977 A1 | 5/2003 |
| WO | 2008067693 A1 | 6/2008 |
| WO | 2009097157 A2 | 8/2009 |

* cited by examiner

GROUP MONITORING SYSTEM AND METHOD

CROSS REFERENCE TO RELATED APPLICATIONS

This application claims the benefit under the Paris Convention of the Nov. 15, 2010 filing date of Australian patent application 2010905070. The disclosure of AU 2010905070 is hereby incorporated herein by reference.

FIELD OF THE INVENTION

The invention generally relates to the field of online monitoring, and in particular discloses a group centric monitoring system for performing security type monitoring activities.

BACKGROUND OF THE INVENTION

Any discussion of the prior art throughout the specification should in no way be considered as an admission that such prior art is widely known or forms part of common general knowledge in the field.

Recently, with the prevalence of the Internet, social networks or groups have become increasingly popular. Internet based applications such as Facebook provide a pervasive, engaging activity base for users, in addition to having many utilitarian uses in collective social behavior.

The internet provides the opportunity to provide new holistic behaviours of collective groups.

SUMMARY OF THE INVENTION

It is an objective of the present invention to provide an improved form of monitoring system utilizing aspects of group centric online activities provided by social networks.

In accordance with a first aspect of the present invention, there is provided an internet based social networking system, the system including: a number of video sensors monitoring a specified environment and streaming video into the system; a series of system users collectively monitoring the video streams and analyzing events generated in relation to the video stream; and a reporting system for reporting actions taken by the system users among the system users.

The specified environment can comprise a neighborhood having a geographic spatial area. The system users are preferably divided into a number of predetermined roles with each role having differing levels of access to the system. The highest level of access preferably can include the ability to add and delete new video sensors to the system. The highest level of access preferably can include the ability to add and delete new users to the system. The highest levels of access preferably can include the ability to delete events generated in relation to the video stream.

The system preferably can include an authorisation access unit for approving access to the system by users and the authorisation access unit allows streamlined access for users authorised to access other predetermined social networking systems. The system preferably can include push notifications to users on the occurrence of predetermined events. The notifications can include at least one of email, SMS, mobile Push Notifications, Facebook or Twitter notifications.

In accordance with a further aspect of the present invention there is provided a system for the enhanced monitoring of a neighborhood environment, the system including: a series of Internet network connected video sensors monitoring various events in the neighborhood environment; and a monitoring application interconnected to the video sensors and running on the network for the monitoring of the video sensors by a collection of users; the monitoring application including an event log for monitoring by the users of events occurring in the neighborhood environment and providing real time interactive comments in relation thereto.

Preferably, the monitoring application further includes authenticating the collection of users before allowing users to access the event log. The collection of users can be divided into a number of groups having different access privileges to the event log.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIG. 11 illustrates the invitation process to invite another party to join a neighborhood watch;

FIG. 14 illustrates the web interface including message posting to an event log;

FIG. 15 illustrates the event log;

DETAILED DESCRIPTION OF THE INVENTION

In the preferred embodiments of the present invention there is provided an effective social networking system for providing monitoring activities. In the preferred embodiment the social networking aspects of Facebook or the like are harnessed to provide a virtual 'Neighborhood Watch' environment with an additional Social Networking Configuration and Event Management, including both video and audio components.

Figure 1:
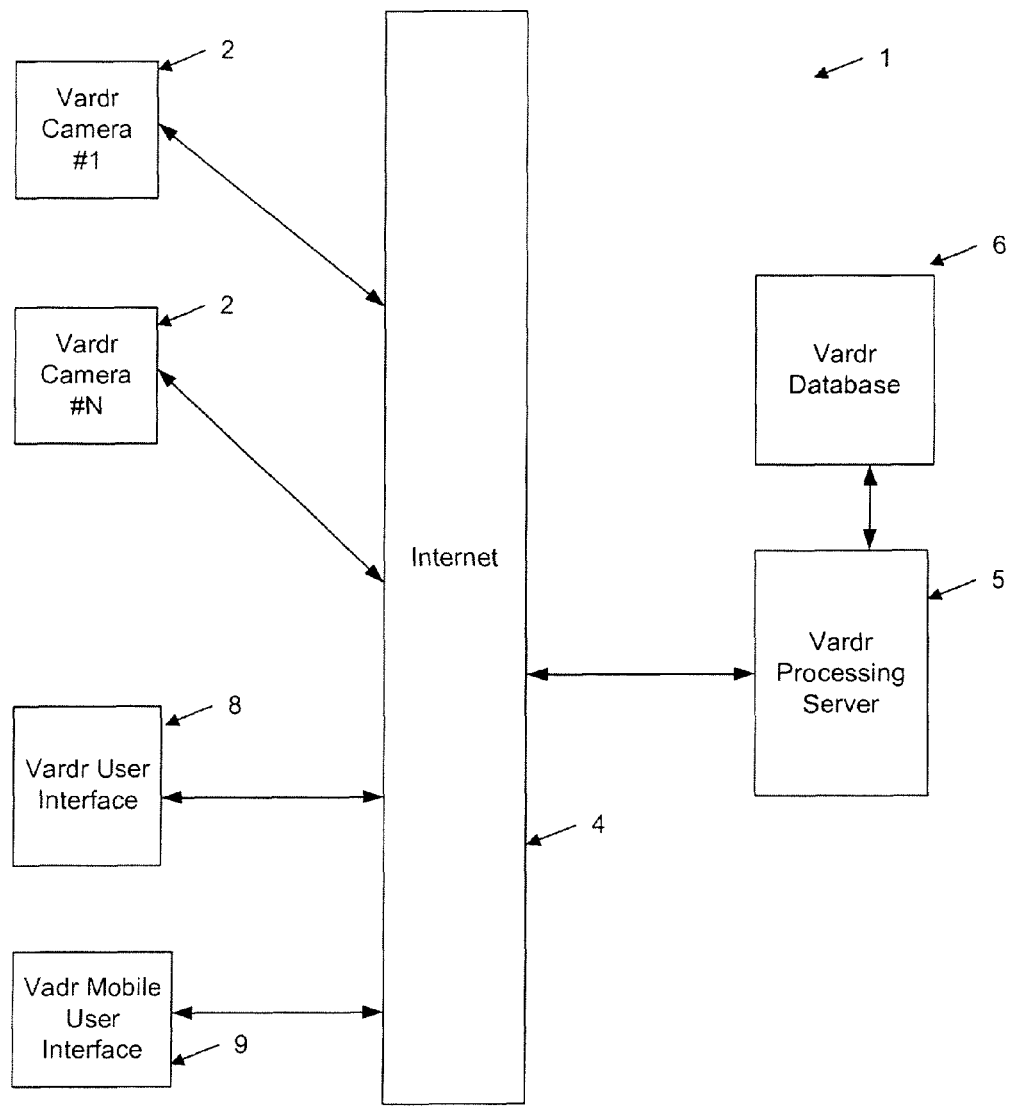
FIG. 1 illustrates schematically an abstraction of the operational environment of the preferred embodiment.

Turning initially to FIG. 1, there is illustrated the overall operational infrastructure 1 of the preferred embodiment, hereinafter denoted the Vardr system. The preferred embodiment includes a series of video sensors e.g. 2 which are designed to operate within an environmental area or neighborhood. The video sensors are streaming type video sensors interconnected to the Internet 4, for streaming information there over. The video sensors are able to accept command and control messages, detect motion, capture and compress video and send video streams to external locations. In one embodiment, the sensors 2 are wireless devices.

The streaming video sensor information is dispatched to a Vardr processing Server 5 for storage in a Vardr database 6. The Vardr Server 5 is further interrogated by users via a Vardr user interface 8 accessible via an Internet browser type environment, or a Vardr mobile user interface 9.

The Vardr processing server 5 includes key software components of the overall system and is responsible for maintaining user accounts, user roles and information and video access control lists. Access control lists are generally divided into neighborhoods.

As will be known to those skilled in the art of construction of a large-scale multi-user Internet type applications, FIG. 1 illustrates an abstraction of the likely infrastructure required. Recently, major service providers such as Google, Amazon etc provide for various infrastructure components for utilization by users that are constructing and deploying large-scale applications. For example, Amazon provides the Amazon Web Services (AWS) infrastructure which allows for deployment of large scale applications in a fault tolerant and load balanced manner. Ideally, in construction of the preferred embodiments, this infrastructure is utilized.

Figure 2:
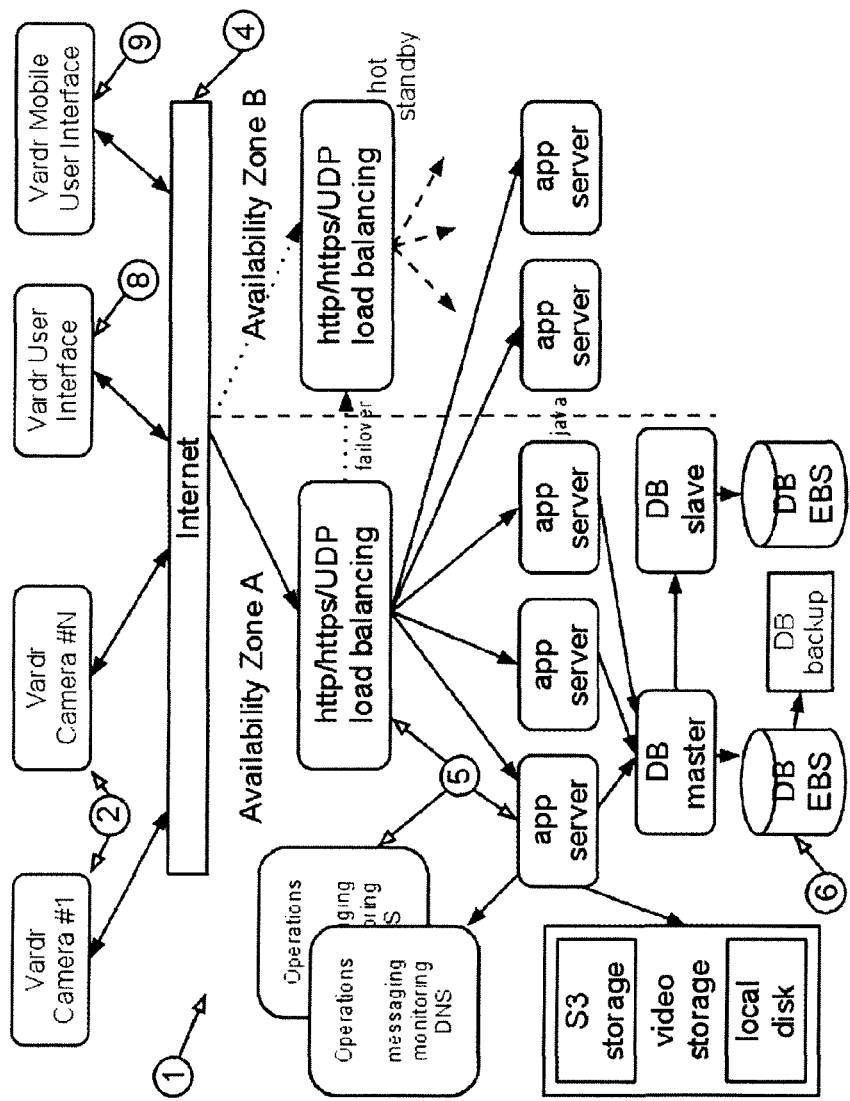
FIG. 2 illustrates one form of implementation of the operational environment of the preferred embodiment in an Amazon Elastic IP framework.

In FIG. 2, there is provided a more specific implementation framework for the provision of Vardr services on the AWS infrastructure. The leveraging of this infrastructure allows for a number of advantages, including hot standby and load balancing.

Point to one active instance for http/https load balancing, Elastic IP is transferred to the hot standby in case of failure, or server in another geographical zone. SSL Termination and Load balancing provides the SSL endpoint for https traffic, utilizes nginx for SSL termination and load balancing, nginx load balancing is by hashing algorithm on the class C client IP address (if session stickiness becomes a requirement, can add an haproxy layer).

The App servers can be implemented utilizing java application servers running the application stack. Jetty application servers can be utilized to handle web and camera requests. A hub server can be used for handling internal job processing. A notification server can be used for emitting email, SMS etc. The system can include an EH Cache (on Terracotta) to share state between camera http requests and camera udp processing. The system can store data in a MySQL database which can include a mysql caching layer if required. The utilization of a MySQL Master and Slave(s) allows for a work around of the Amazon RDS maintenance window. The database can be stored on an Amazon elastic block storage. The slaves can be used in a read-only mode to provide future additional scalability for data reads. The EBS snapshot facility can be used to backup the DB filesystem, rather than DB exports. The AWS also provides scaling and redundancy infrastructure for running applications.

The Vardr system operates around the concept of video surveillance utilizing neighborhood watch type concepts. Users set up a personalized account. Each Vardr user account contains all the data necessary to uniquely identify a User and for that User to receive Neighborhood and Video sensor event information from the Vardr Servers. A Vardr User Account is owned and controlled by the user. Data stored can include: First name, Last name, Password, Email address, Mobile Phone Number, Twitter ID, Facebook ID, and other ancillary ID information including MySpace ID, location and other social network credentials.

User Accounts Must be Opted-in to the Vardr System.

Users control how they are communicated with on a per Neighborhood basis via an access control page. For example, in a Neighborhood that the User owns he may decide to receive events via SMS, Email, Mobile Push Notifications, Facebook User Streams, and Direct Messages in Twitter, but in a friends Neighborhood only via Email and Push Notifications.

When initially logging into the system, users can authenticate themselves in a number of ways: Logging in using Email address and Password; connecting to their Facebook account; or signing into their Twitter account. Other potential credential systems having an appropriate API can be utilized.

The Vardr system uses standard $3^{rd}$-party authentication mechanism provided by each of the Social Networks. For example, Twitter uses OAuth 1.0a. Facebook uses an early implementation of OAuth 2.0. In the Vardr system, User Accounts must have authenticated themselves with Twitter and/or Facebook before they can search for friends to add as User Accounts, via either of those social networks.

The Vardr system includes the concept of a User Role, which is a set of Access Control Lists (ACL) capabilities on a per Neighborhood basis. The ACLs are used in two types of user interaction:

Displaying a list of resources a User has access to e.g. Neighborhoods and Video sensors they can view and manipulate; and Checking they have permission to perform an action on a resource e.g. view the video from a specific video sensor or activate the system for a particular neighborhood.

In normal usage, all permission checks should pass because Users only see resources they can use. Access denial would only happen if the access control has been changed in the near past, or if someone starts trying to hack the URLs to the web service.

Currently Vardr utilizes three core Roles based on a cowboy metaphor:

Sheriff—the owner/creator of a Neighborhood and its Video sensors. A Sheriff has the unlimited capabilities inside his Neighborhoods;

Deputy—A Deputy can enable or disable Video sensors in a Neighborhood, update and view the Neighborhood and Video sensor event logs and view video.

Posse—A Posse can update and view the Neighborhood and Video sensor event logs and view video.

A Users Account's Vardr system is made up of one or more Neighborhoods. A Neighborhood is an arbitrary collection of Video sensors and links to other User Accounts who have opted in to be part of that community of crime fighters.

Each Neighborhood contains one or more linked and opted-in User Accounts. A Neighborhood 'Sheriff' can invite new users into the Neighborhood. The users can be invited to opt-in to the Vardr system by means of via Email_address, Twitter_ID, Facebook_ID, etc.

In the event the prospective Neighborhood member does not have an existing User Account, a Neighborhood 'Sheriff' can invite a new user by entering at least one of Email_address, Twitter_ID, or Facebook_ID. Subsequently, the new User Account will receive an opt-in message via the relevant communication method and confirm the User Account details and create the User Account. It should be noted that after this point the User Account and method of Notification is under the control of the owner of the User Account and not the 'Sheriff' that added them initially.

For Existing User Account Search, or to Add a New User Account:

The Twitter_ID must be a Follower to facilitate secure Twitter Direct Messages.

The Facebook_ID must be a Friend to support Facebook's stream.publish to a list of Facebook_IDs.

A Vardr Video sensor can be in only one Neighborhood at a time. Vardr's user interface 8 supports functionality to allow Video sensors to move from one Neighborhood to another. A Video sensor can be either Private or Public. Private Video sensor event information and video is only available to the 'Sheriff'.

Vardr's Event Services provides a 'News Feed' like stream of triggered and manually entered events for Video sensors.

The user interface can be constantly evolving, including migration to an alternative mobile Vardr interface 9 over time.

Figure 3:
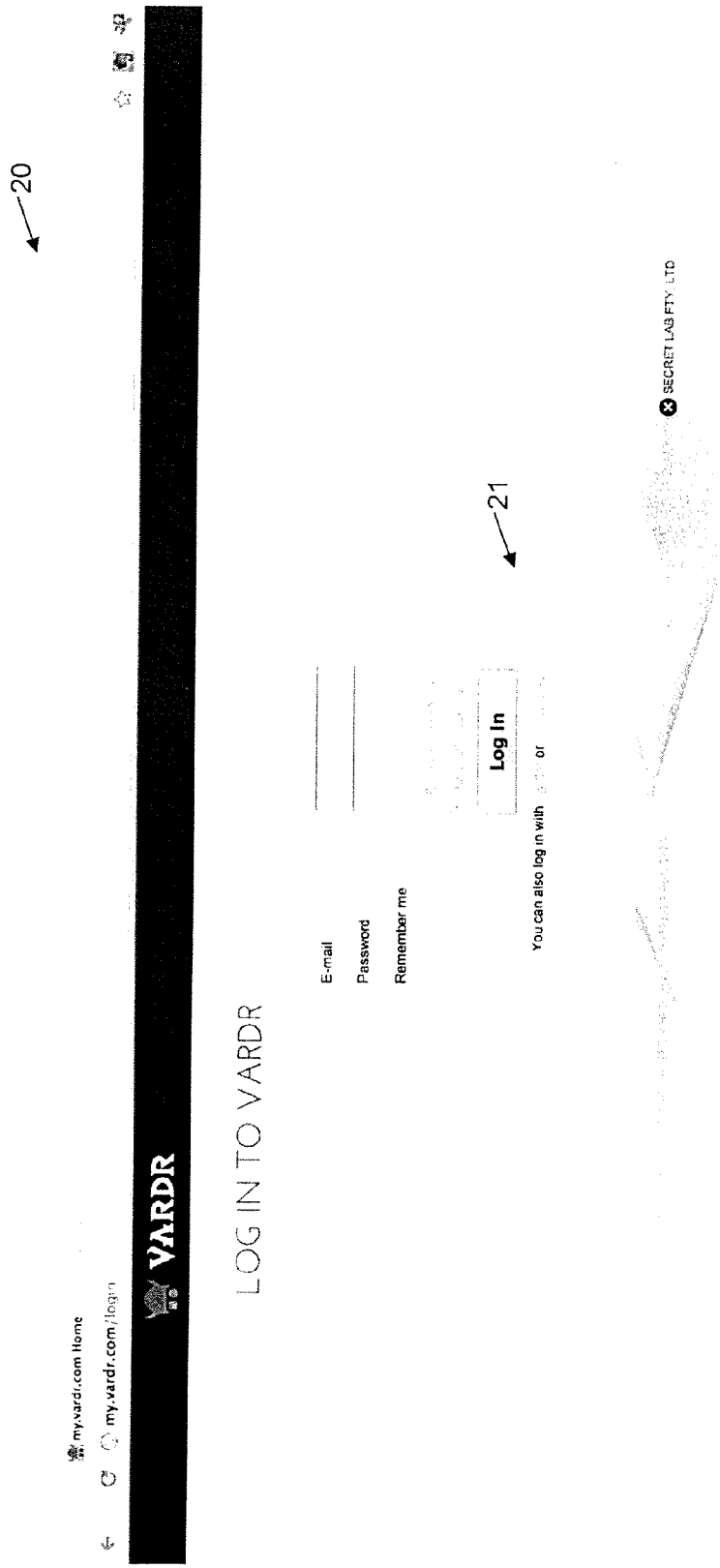
FIG. 3 illustrates an initial login screen.
Figure 4:
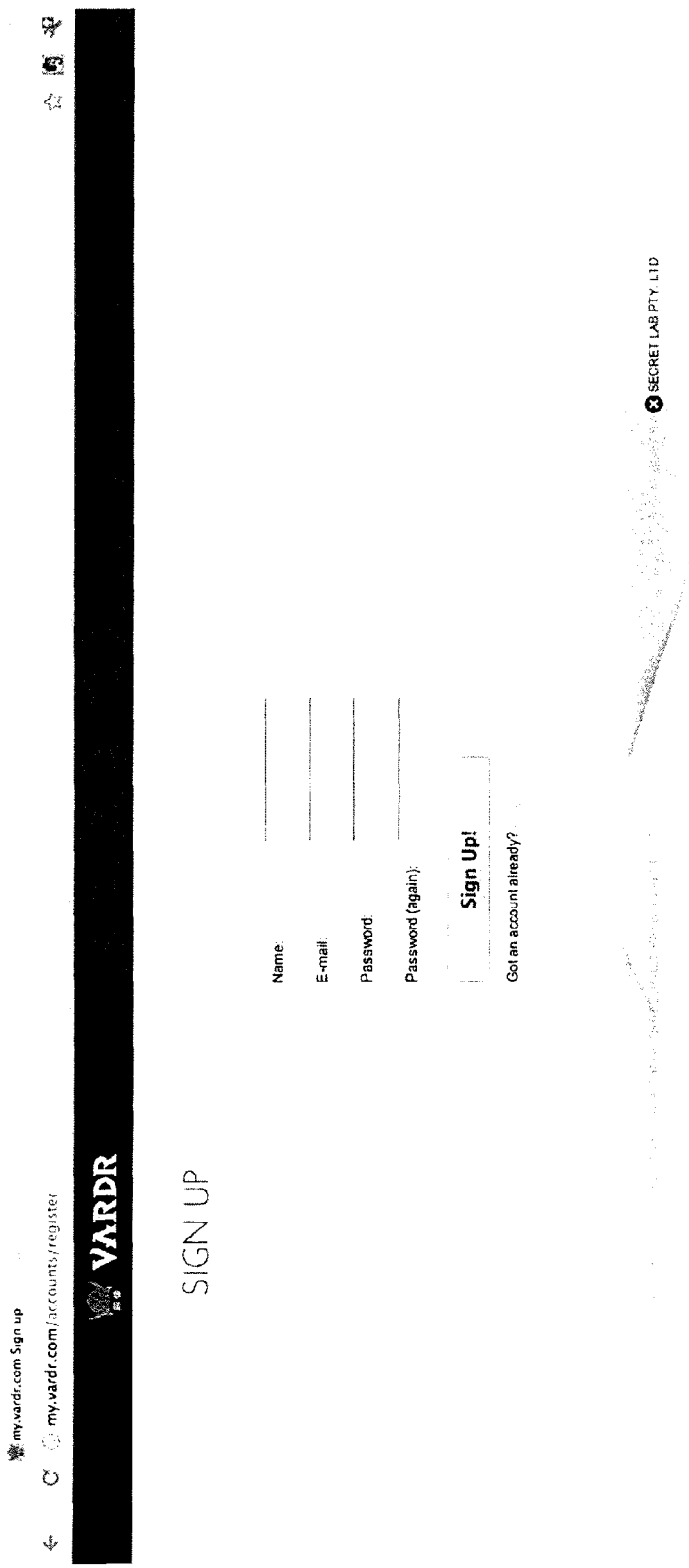
FIG. 4 illustrates an account sign up process.
Figure 5:
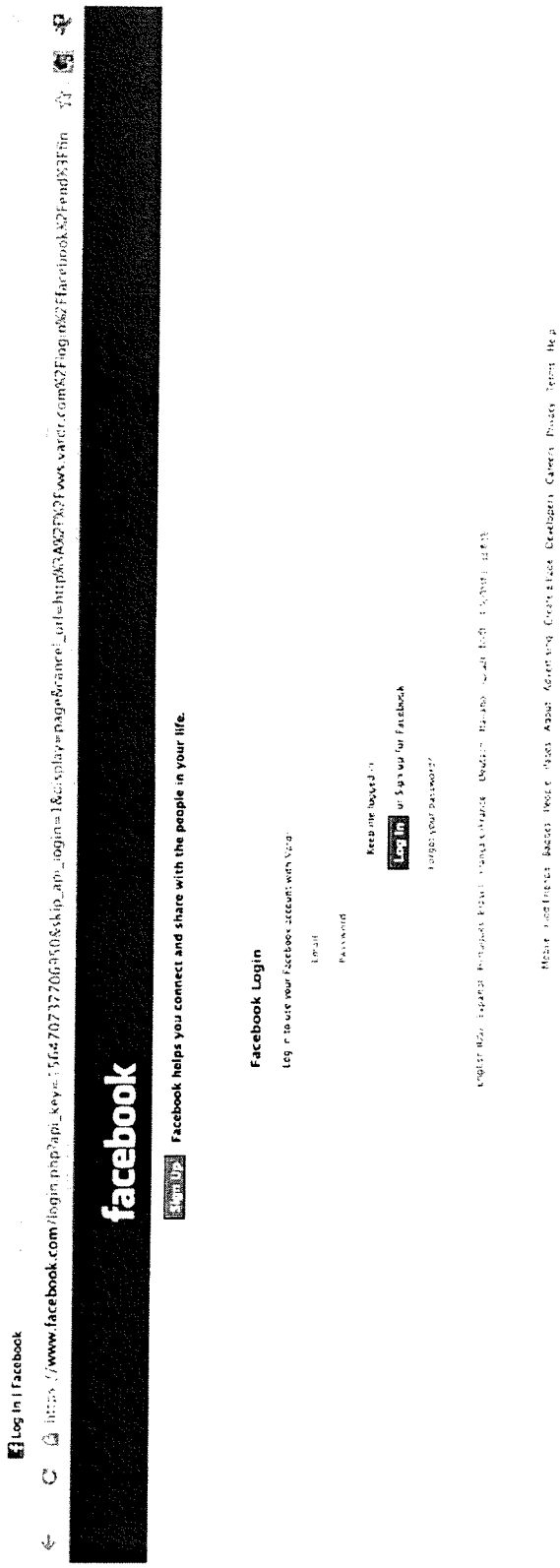
FIG. 5 illustrates a facebook sign up process.
Figure 6:
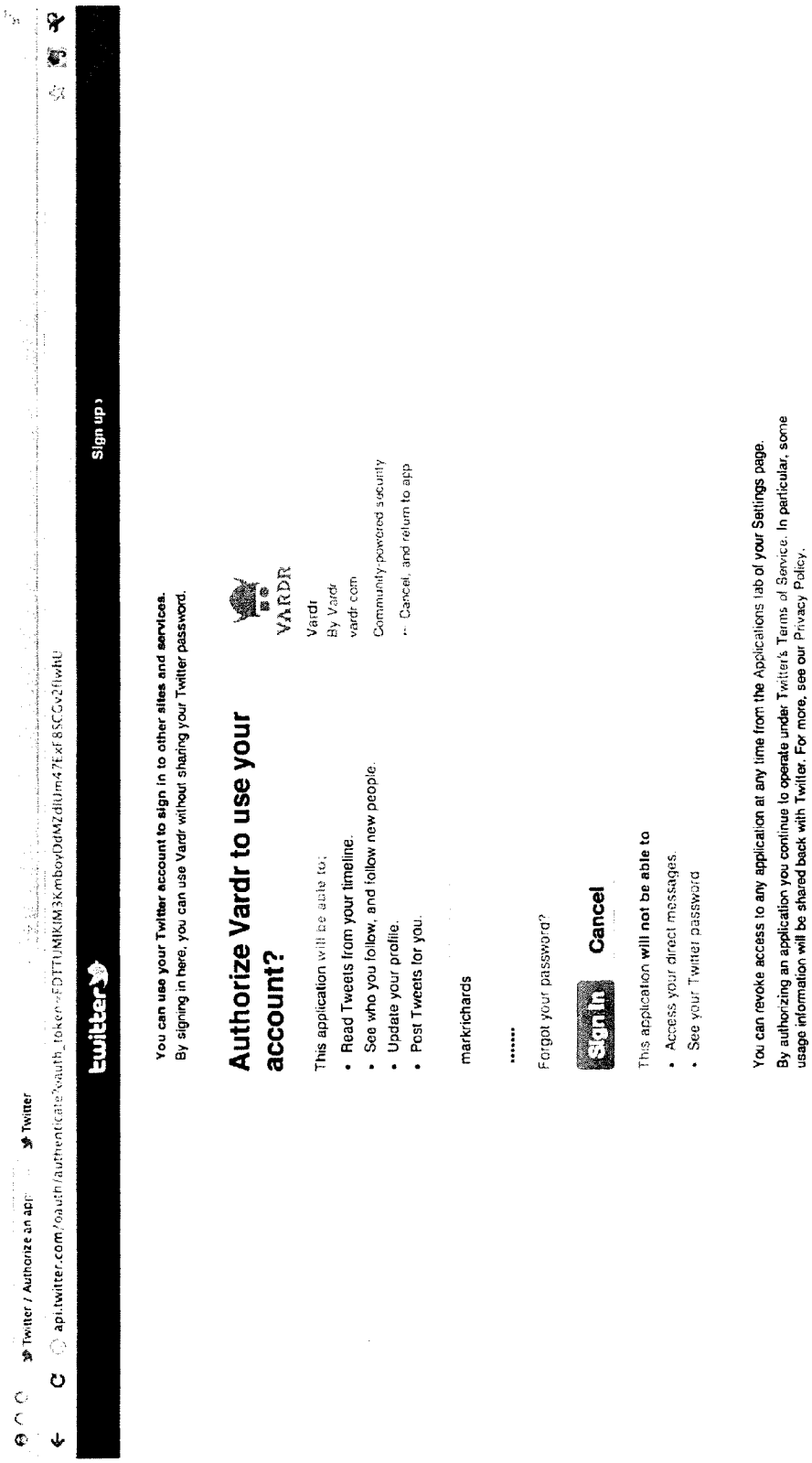
FIG. 6 illustrates a twitter sign up process.

Turning now to FIG. 3 to FIG. 17 there is illustrated a series of mock up user interfaces of one prototype design for interaction with the Vardr Server. FIG. 3 illustrates an initial login screen for accessing the Vardr servers. The login screen 20 includes an alternative ability to utilize secure login facilities of alternative social networks such as Facebook or twitter. FIG. 4 illustrates the process of new account registration with specific user details collected. FIG. 5 illustrates the process of signing up via Facebook. Other alternatives can be provided. For example, FIG. 6 illustrates the process of siging up via a Twitter API.

Figure 7:
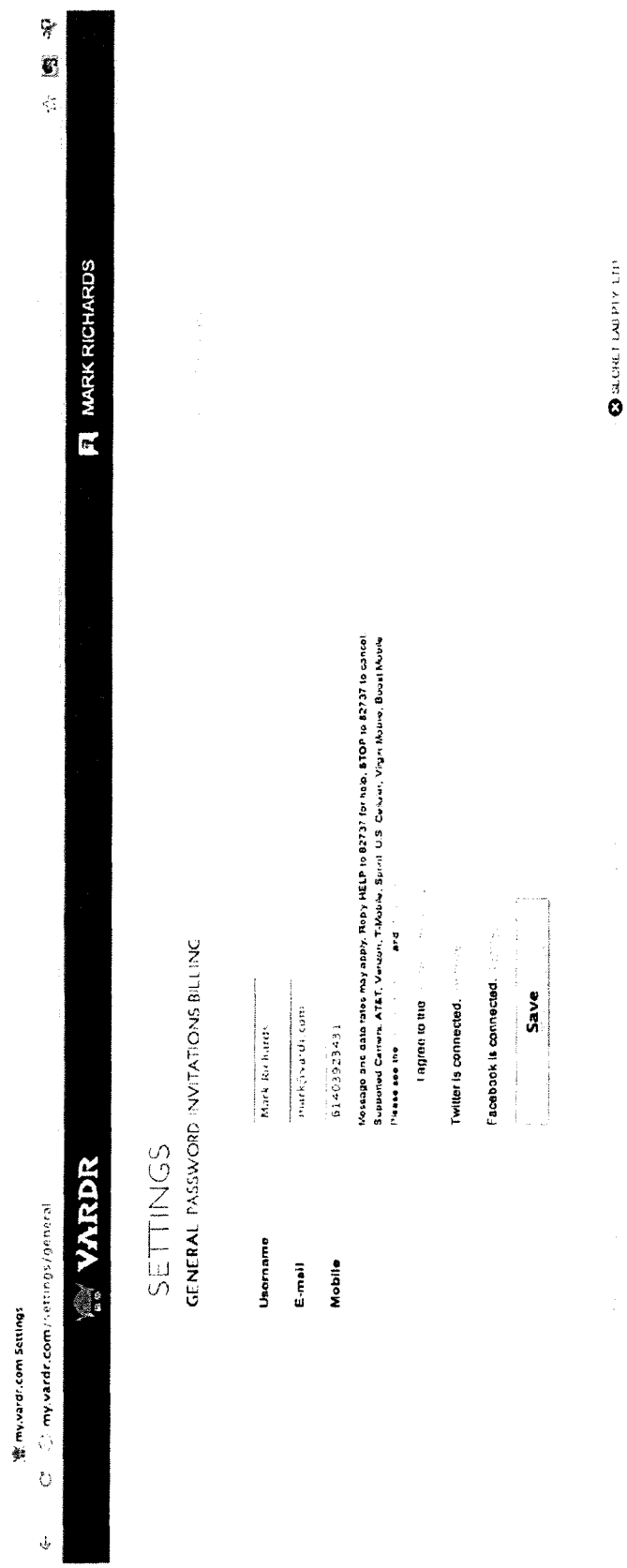
FIG. 7 illustrates a process amending settings within the Vardr system.

As part of the sign in process, as illustrated in FIG. 7, the user is provided with the option of setting a mobile number for SMS notifications, connecting with Facebook and twitter accounts. Upon completion of the notification process, a summary of the provided access to the account is output for the users review.

Figure 8:
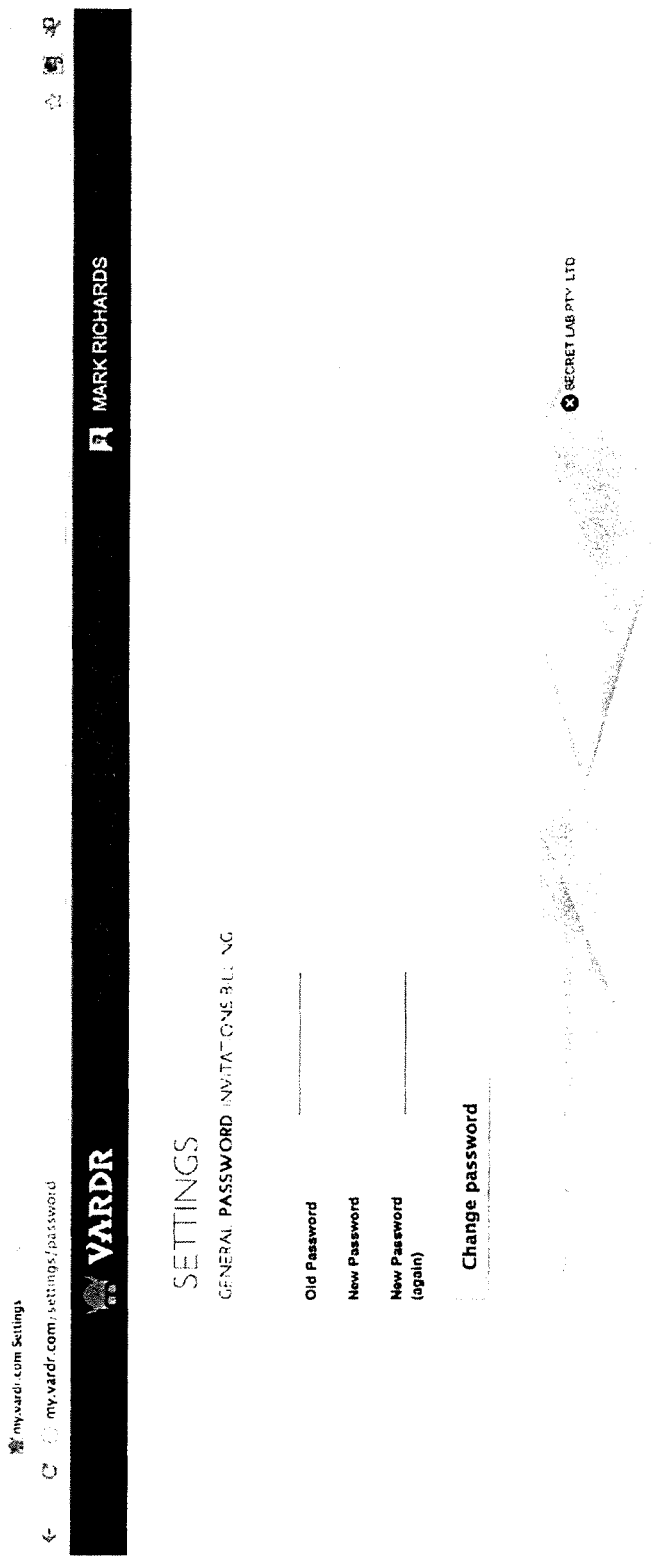
FIG. 8 illustrates a further password amendment process.

As a further part of the account keeping process, the usual password updating facility is provided, similar to that illustrated in FIG. 8.

Figure 9:
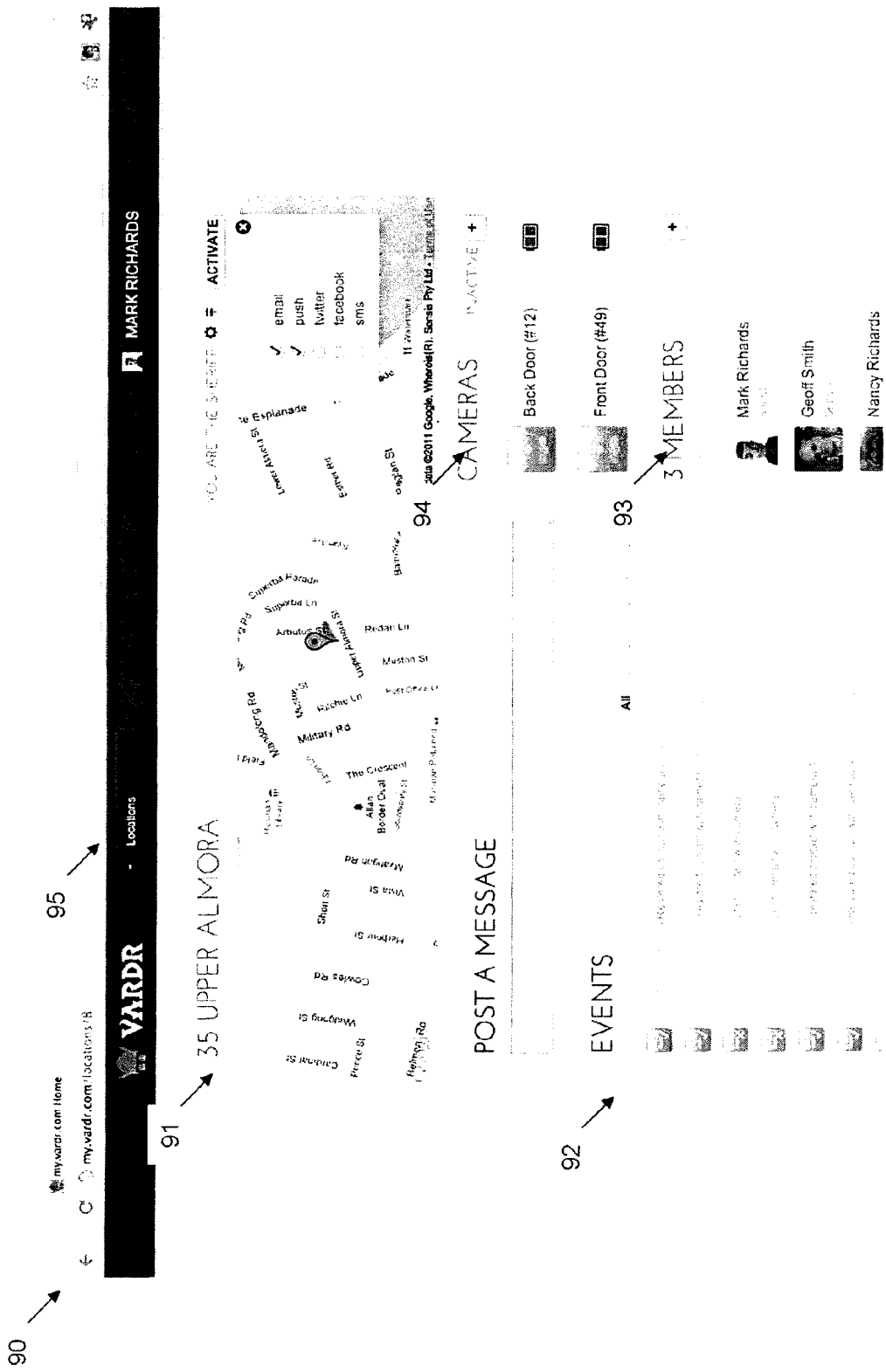
FIG. 9 illustrates one form of web interface to the operational environment of the preferred embodiment.

As shown in FIG. 9, upon logging in the User is presented with their default neighborhood 90. The default neighborhood interface includes a map 91, an event log 92, a list of members 93 and a list cameras 94. The user is able to access other neighborhoods via popup 95.

Figure 10:
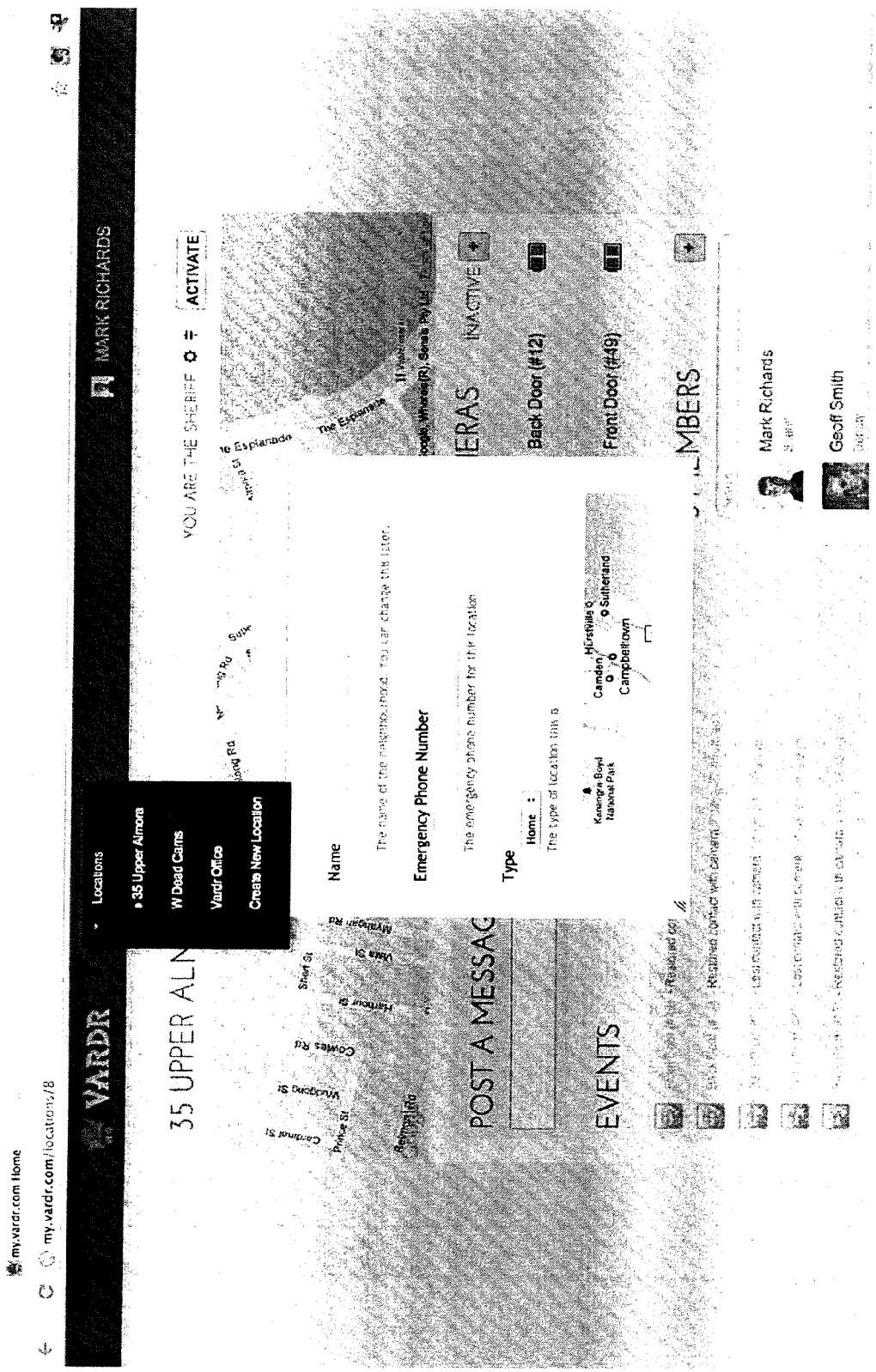
FIG. 10 illustrates the process of creating new environments.

FIG. 10 illustrated the process of creating a new neighborhood via the popup, with a new neighborhood details being entered.

Figure 11:
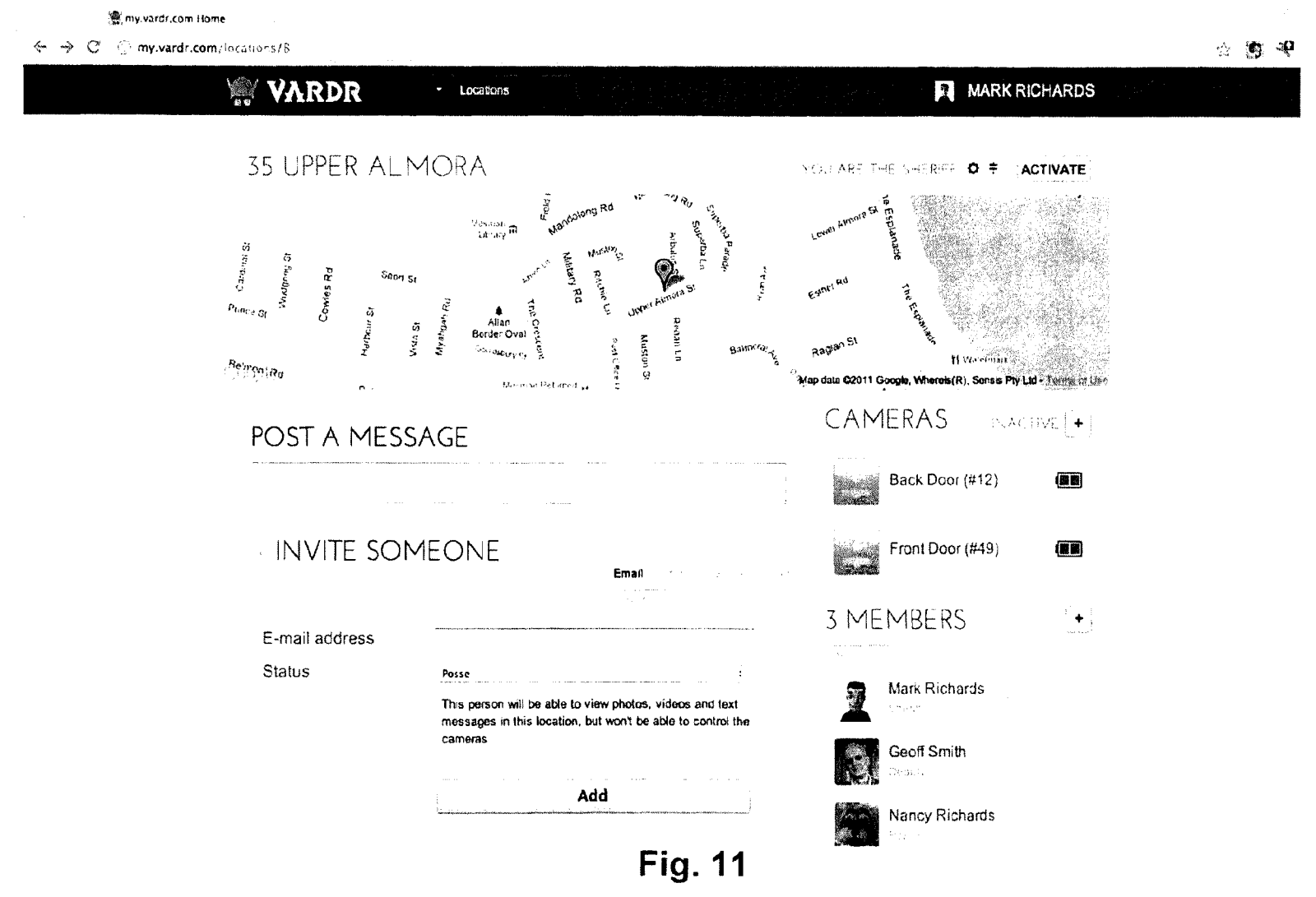

FIG. 11 illustrates a process of inviting third parties to join a neighborhood. The user is provided with various techniques for sending a potential Posse member a message with a link for sign up at various levels including Posse, Deputy or Sheriff.

Figure 12:
FIG. 12 and FIG. 13 illustrates the process of adding a camera to a neighborhood.
Figure 13:
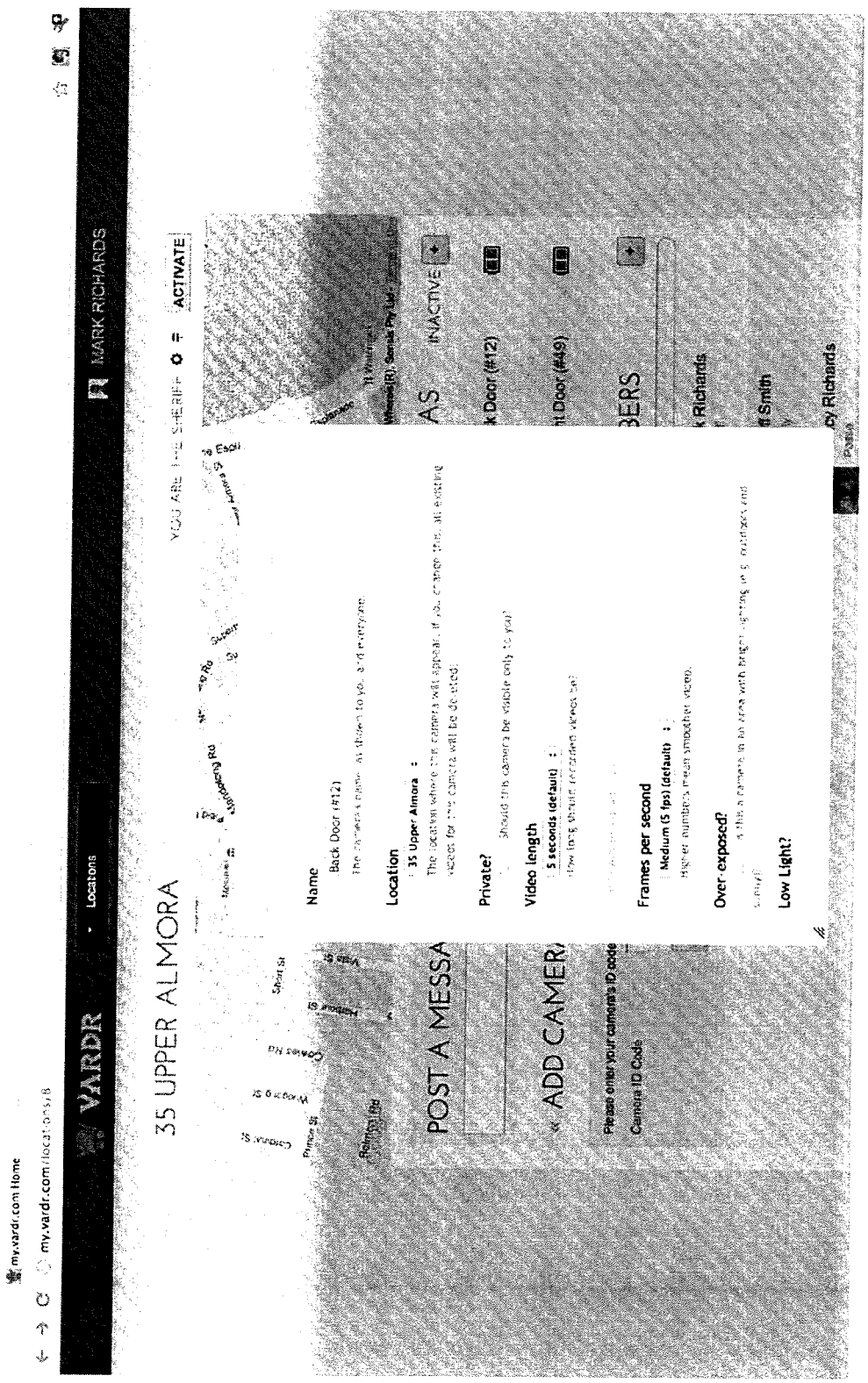

Each neighborhood includes a series of active cameras. The numbers of cameras can be added and deleted. FIG. 12 illustrates an interface for adding cameras to a particular neighborhood. Upon adding the camera it is added to the camera list. Various settings associated with the added camera can then be utilized and set by the user (as shown in FIG. 13). Users are able to request a camera capture or stream a video segment as an event.

Each neighborhood is centralized around an event log. Messages are posted to the event log automatically by attached cameras on the occurrence of various activities and by users who are able to post messages. One such posting message interface is shown in FIG. 14.

Figure 16:
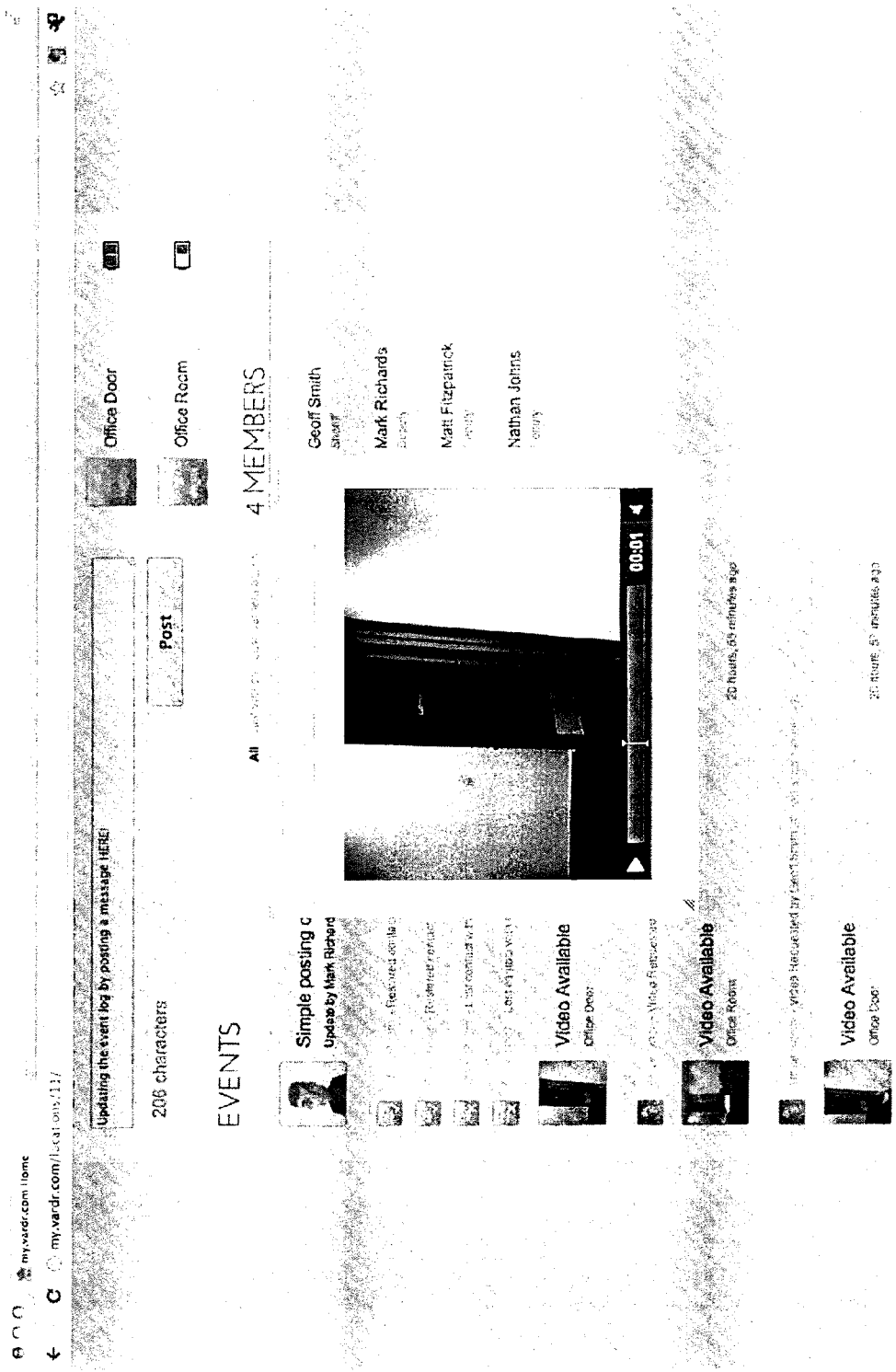
FIG. 16 illustrates a video event in the event log.

Video events are posted to the event log and can be accessed for viewing. An example viewing of video segment is shown in FIG. 16.

Figure 17:
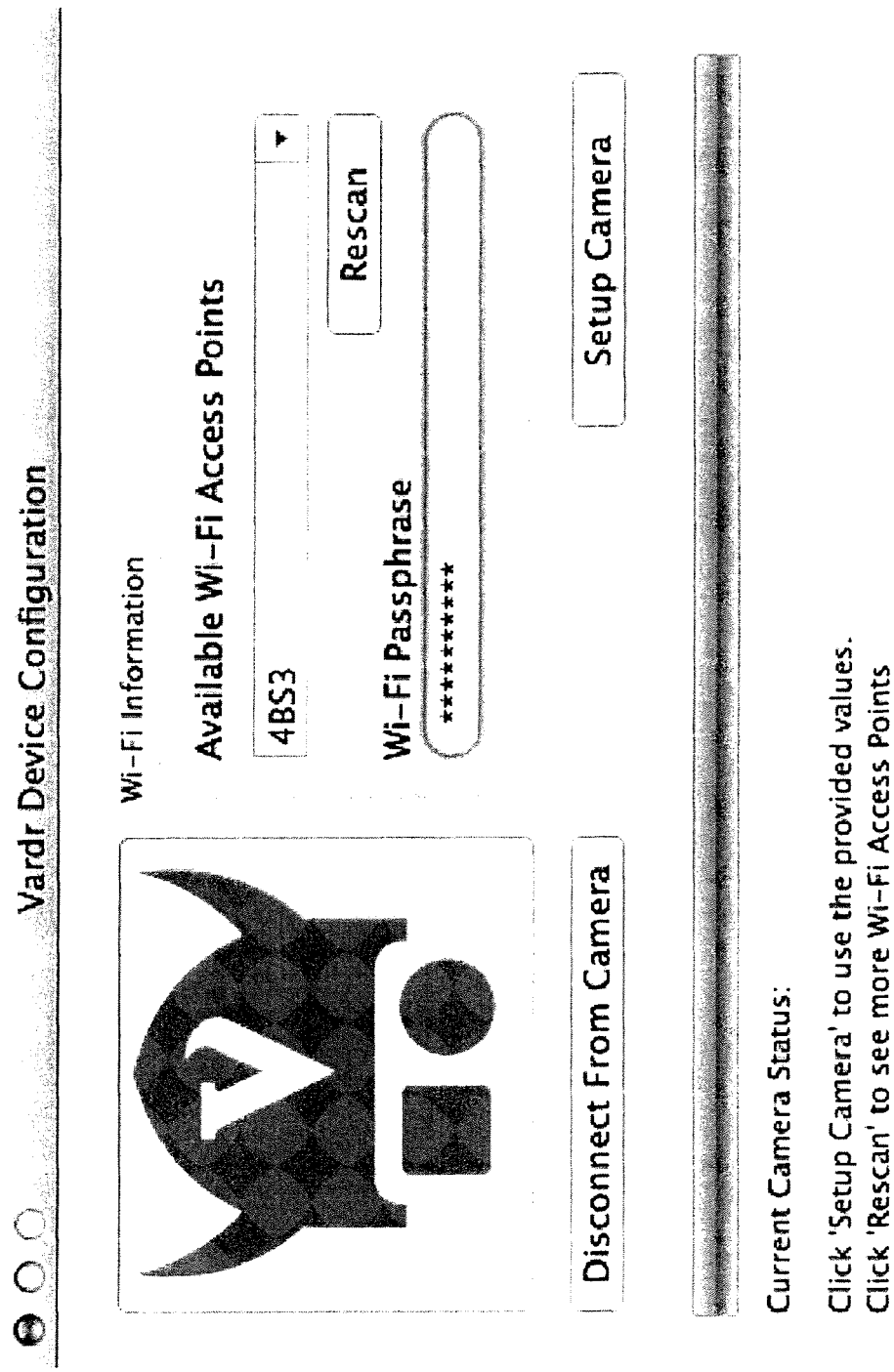
FIG. 17 illustrates the process of enrolling a new video sensor device.

FIG. 17 illustrates the process of adding a video sensor to the Vardr system illustrating the data entry associated with a video sensor addition.

Each neighborhood is driven by a series of events, with users interacting with the event logs of the neighborhood. The users are able to direct the video sensors to perform various functions such as capturing video or the like. This can include the deletion of viewed events. Each event can be observed and commented on by members of the neighborhood.

Vardr Application Program Interface (API)

While many different APIs can exist for the Vardr design, one form of API will now be described. Initially, a number of definitions are provided:

User: users may have up to one associated account; each account may have multiple Neighborhoods. Users are attached to Neighborhoods via a Community.

Account: accounts have Neighborhoods. They can also store billing information. There must be one user with the 'Sheriff' role for that Neighborhood who also owns the Account associated with the Neighborhood.

Neighborhood: a Neighborhood is attached to an account. There can be multiple Neighborhoods per account. There can be multiple Neighborhoods at a physical location. For example there might have a 'Perimeter' Neighborhood and an 'Inside' Neighborhood at my house. But there might also be a completely separate Neighborhood e.g. 'Beach House'. Neighborhoods have multiple video sensors attached to them. Each Neighborhood has one or more Communities (or members).

Community: Each Neighborhood has one or more users attached to it via a Community. Each member of that community has a role in that Neighborhood (Sheriff, Deputy, Posse) with different privileges and notification preferences, all of which are associated with a Community.

Roles: a user can have different roles in different Neighborhoods. The possible roles are: Posse: Posse can view the video sensors (except those with a privacy flag), Posse can log text events and can request a video capture (but only if the system is active) and only those that do not have a privacy flag; Deputy: can have the Posse role plus can activate/deactivate the Neighborhood; Sheriff: owns the Neighborhood and has complete access.

Video sensor: each Neighborhood can have multiple video sensors. A video sensor may be triggered in which case it uploads a video event and this causes members of the Neighborhood to which a video sensor is attached to be notified.

Events: there are initially five types of event: video_triggered: this is a video event and the event was caused by a PIR (or other kind) of security trigger (i.e. this is an alarm); video_requested: this is a video event but the event was caused by a user request and is not considered an alarm (i.e. does not cause a notification to the community); activated: the system at this Neighborhood has been activated; deactivated: the system at this Neighborhood has been deactivated; text: a member of the community has entered a text log e.g. "sorry I forgot to disarm the system". Of course, there may be new event types added later.

Event States: states for an event are "unattended|attended|trashed". All events are unattended until an Sheriff/Deputy makes the Neighborhood inactive. In this case all events prior to the timestamp of the deactivation are marked as attended. An individual event may be marked as attended (aka dismissed) by the Sheriff. If marked 'attended' the event still appears in the events list but may be dimmed. Events marked 'trashed' do not appear in the events list. The server side may periodically delete trashed events. Depending on policy the server may delete or archive events that are past a certain period regardless of their state. All 'unattended' events for a video sensor are marked as 'attended' when the video sensor is deactivated.

When a video sensor is first purchased, if not already registered then, using the web presence, the user is expected to register as a user, create an account and create at least one Neighborhood for that account. The user automatically assumes the 'Sheriff' role for that Neighborhood, a Community is created and the user is added as a member of that community with role of 'Sheriff'.

Prior to configuration, the user chooses the Neighborhood for the new video sensor and enters a unique key that identifies the video sensor within the Vardr system. This registration creates a new database video sensor record.

Where the video sensor operates in a wireless manner, the configuration application associates the video sensor with a Wi-Fi access point. Where a wired sensor is provided, the video sensor setup involves inserting a USB cable and connecting to a laptop/PC, and starting the configuration program on the laptop/PC. The user enters: the user's userid for Vardr, and password. The user then gives video sensor a name—e.g. "Garage" "Lounge Room".

Wi-Fi Access point SSID (ideally the video sensor has performed a scan and can present visible Access Points in a pull down list). The configuration program initiates a test to see if a connection can be made to the AP. The video sensor then connects and registers itself to the Vardr service. Video sensors are off by default and will be given default operating parameters (run time, query period etc). The user logs into the system and can do further organization of their account, Neighborhood and video sensors.

As noted previously, users log into the Vardr servers over https and use a standard username/password login mechanism with sessions etc. The username is an email address supplied by the user. Alternatively a user may log in using suitable social networking authorization methods. Once logged in a user may: have an operation view similar to the mobile platform view; have an administration view where they can; adjust their user details; adjust their account details (there may be more than one account); pay their account bills; create/modify Neighborhoods within those accounts; move video sensors to Neighborhoods; change video sensor operating conditions; find community members and add/invite them to the Neighborhood's community; remove members from the Neighborhoods community; give community members a role (the default role is Posse) but the member may be given 'Deputy' privilege; dismiss (aka trash) events, request archiving of events etc.

The mobile platform applications (or the operational view in the web presence) provide the normal use interfaces when the system is operational. In particular the ability to enable/disable the system, the ability to be notified of events and for the community of the location to respond to those events. Notifications to community members may be made through SMS, push, email, Twitter and/or Facebook.

Vardr Database Definition

As noted previously data is stored within the Vardr database. 6 (FIG. 1). One form of database field definition can be as set out in the following tables:

Common data types: fields are nullable except where declared 'not null' below; table ID fields are bigint; datetime fields are bigint and store milliseconds since the epoch; enum fields are tinyint. Mapping from the tinyint to a string value for the enum are defined in this document. They may be stored in the DB in a table for use with SQL reporting. string fields are all varchar (255) i.e. a varchar that only uses a one-byte length; boolean types are char (1) with values 'Y' and 'N'

User

| Attribute | Type | Comments |
|---|---|---|
| USER_ID | bigint not null primary key | auto generated in database |
| (USERNAME) | varchar(255) | |
| ACTIVE | char(1) | boolean |
| EMAIL | varchar(255) | |

-continued

| Attribute | Type | Comments |
|---|---|---|
| PASSWORD | varchar(255) | stored encrypted or stored in a key store |
| FIRSTNAME | varchar(255) | |
| SURNAME | varchar(255) | |
| SALT | varchar(255) | |
| (LANGUAGE) | varchar(255) | for when we go multi-lingual |
| (COUNTRY) | varchar(255) | useful to know for formatting information, e.g. dd/mm/yyyy or deg F., or spelling |
| (CELL) | varchar(255) | cell phone number, including country code e.g. 61412007354 |
| (PUSH_TYPE) | tinyint | enum 1 = apple \| 2 = android \| 4 = blackberry |
| (PUSH_ID) | varchar(255) | push token, may vary depending on phone being accessed |
| (TWITTER_PROFILE_ID) | bigint | foreign key to TWITTER_PROFILE table |
| (FACEBOOK_ID) | varchar(255) | |
| (SOCIAL_ONLY) | char(1) | boolean. indicates that this user is not a real user, they have a user account by virtue of being an invited user in a community. Access for these users is controlled by social network authentication methods only. Note normal users may authenticate via social networks as a convenience. |
| LAST_UPDATED | bigint | datetime this record was last updated |

Twitter_Profile

| Attribute | Type | Comments |
|---|---|---|
| TWITTER_PROFILE_ID | bigint not null primary key | auto generated in database |
| IS_ACCESS | char(1) not null | whether access token is stored |
| TOKEN | varchar(255) | oauth token from twitter |
| TOKEN_SECRET | varchar(255) | oauth token secret from twitter |
| TWITTER_ID | varchar(255) | twitter ID |
| USERNAME | varchar(255) | twitter username (can be changed on Twitter after initial storage!) |
| CREATED_ON | bigint not null | timestamp; used to help clean up old request tokens |

Account

| Attribute | Type | Comments |
|---|---|---|
| ACCOUNT_ID | bigint not null primary key | auto generated in database |
| BILLING_ADDRESS | varchar(255) | |
| BILLING_COUNTRY | varchar(255) | |
| BILLING_ZIPCODE | varchar(255) | |

Neighborhood A user will likely have a role in multiple Neighborhoods. A Neighborhood is in a 'triggered' state if there are any events for any video sensor in the Neighborhood where the event type is 'video_triggered' and the event state is 'unattended'.

| Attribute | Type | Comments |
|---|---|---|
| NEIGHBORHOOD_ID | bigint not null primary key | auto generated in database |

-continued

| Attribute | Type | Comments |
|---|---|---|
| ACCOUNT_ID | bigint not null | link to accounts table (set to null if Accounts is not implemented yet) Foreign key to ACCOUNT. |
| NAME | varchar(255) | a name that means something to the Sheriff about the location, e.g. "Home" |
| TIMEZONE | varchar(255) | timezone at Neighborhood (server stores time in UTC, its converted (by server) based on the location's timezone |
| POLICE | varchar(255) | phone number for police at this location |
| DELAY | int | Delay in seconds before viewers of this location are notified - to allow suppression of false alarms. Sheriffs and Deputies are not subject to the delay. |
| LAST_UPDATED | bigint | datetime this record was last updated |

The location_id is attached to its members via the CommunityMember table. One of or more of these will be the Sheriff role for the location, and exactly one will also be the Sheriff of the Account to which these locations belong).

Camera

A video sensor is in a 'triggered' state if there are any events for the video sensor where the event type is 'video_triggered' and the event state is 'unattended'.

| Attribute | Type | Comments |
|---|---|---|
| CAMERA_ID | bigint not null primary key | auto generated in database |
| LOCATION_ID | bigint not null | foreign key to LOCATION |
| NAME | varchar(255) | a name that means something to the Sheriff, e.g. "Garage", "Lounge Room" |
| MAC_ADDR | bigint | unique mac address, 48 bits |
| CAMERA_TYPE | varchar(255) | e.g. Prototype_1 , Model Number X |
| FIRMWARE_REVISION | varchar(255) | |
| IMAGE_TYPE | varchar(255) | image/vardr-binary |
| IMAGE_SIZE | varchar(255) | e.g. "640 x 480", "320 x 240" |
| ACTIVE_STATE | tinyint | enum 0 = OFF, 1 = TURN_OFF, 2 = ON, 3 = TURN_ON - this allows a message to be set for the video sensor the next time it checks, after the check TURN_ON becomes ON and TURN_OFF becomes OFF |
| PRIVACY_FLAG | char(1) | boolean. video sensor has been marked private, it is only viewable by the Sheriff |
| RUN_TIME | int | video capture run time in seconds, default 10 |
| FPS | int | frames per second, default 5 |
| CAPTURE_NOW | char(1) | boolean. initiate a capture when next polled by the video sensor. note that this attribute is set to false by the video sensor once the capture has taken place |
| KEEP_ALIVE | char(1) | boolean. tells the video sensor to either stay powered up or do very rapid queries (exact function is tbd) |
| QUERY_PERIOD | int | time between queries un seconds(default 45) |
| LAST_UPDATED | bigint | datetime this record was last updated |

Event

| Attribute | Type | Comments |
|---|---|---|
| EVENT_ID | bigint not null primary key | auto generated in database |
| LOCATION_ID | bigint | Copied from CAMERA at the time the event occurred, or specified for text event |
| CAMERA_ID | bigint | optional, null for text events - text events are linked to a location only |
| DATETIME | bigint | perhaps a long, milliseconds since epoch |
| TYPE | tinyint | enum 0 = video_triggered \| 1 = video_requested \| 2 = activated \| 3 = deactivated \| 4 = text |
| SMALL_URL | varchar(255) | url to small video |
| MEDIUM_URL | varchar(255) | url to medium video |
| LARGE_URL | varchar(255) | url to large video |
| LOG_TEXT | varchar(255) | only relevant to events of type text |
| STATE | tinyint | enum 0 = unattended \| 1 = attended \| 2 = trashed |
| PRIVACY_FLAG | char(1) | boolean. Copied from CAMERA at the time the event occurred. |
| LAST_UPDATED | bigint | datetime this record was last updated |

ACL_Entry

Define the roles that apply to a user for a given resource. Uniqueness is defined by user_id+resource_type+resource_id, on the current assumption that roles are hierarchical in nature so only one role applies per user per resource.

| Attribute | Type | Comments |
|---|---|---|
| USER_ID | bigint not null primary key field 1 | Foreign key to USER |
| RESOURCE_TYPE | varchar(255) not null primary key field 2 | enum? "LOCATION", "CAMERA" |
| RESOURCE_ID | bigint not null primary key field 3 | Foreign key to a resource table e.g. LOCATION, CAMERA |
| VALUE | varchar(255) not null | enum? "OWNER", "VIEWER", "ACTIVATOR" |
| LAST_UPDATED | bigint | datetime this record was last updated |

Community (or Neighborhood)

An entry is uniquely defined by location_id and user_id. A Neighborhood will have one Sheriff, and optionally Deputies and Posse. A common scenario will have all members of a family able to access a Neighborhood. Larger groups will exist for neighborhood watches.

| Attribute | Type | Comments |
|---|---|---|
| LOCATION_ID | bigint primary key field 1 | foreign key to LOCATION |
| USER_ID | bigint primary key field 2 | foreign key to USER |
| (NOTIFICATION) | binary flags | email = 1 \| twitter = 2 \| facebook = 4 \| sms = 8 \| push = 16 |

-continued

| Attribute | Type | Comments |
|---|---|---|
| STATE | tinyint | enum 0 = requested | 1 = accepted |
| ALIAS | varchar(255) | user set alias for location |
| (INVITED_ROLE) | varchar(255) | used to invite new users to a community, with a particular role. becomes an ACL_ENTRY on acceptance |
| LAST_UPDATED | bigint | datetime this record was last updated |

Community members may be notified over multiple methods in parallel. So the notification attribute is a binary flag that allows for none, some or all of the notification types to be true. The state attribute indicates whether the user has accepted the request from the Sheriff of this Neighborhood to be a community member. In some cases (e.g. twitter id) we may not have a user_id table entry at the time of the request. The assumption is that accepting the invitation (via twitter) will create a user_id table entry.

Token

A user has one token per oauth service e.g. phone, tablet, home browser, work browser. Say 3 tokens per user on average.

| Attribute | Type | Comments |
|---|---|---|
| VALUE | varchar(255) not null primary key | |
| USER_ID | bigint | foreign key to USER |
| ACCESS_TOKEN | tinyint | |
| CALLBACK_URL | varchar(255) | |
| CONSUMER_KEY | varchar(255) | |
| SECRET | varchar(255) | |
| CREATED_ON | bigint | datetime |
| VERIFIER | varchar(255) | |
| LAST_UPDATED | bigint | datetime this record was last updated |

Platform_Configuration

For settings that can be dynamically set, for instance Twitter Consumer Key/Secret.

| Attribute | Type | Comments |
|---|---|---|
| NAME | varchar(255) primary key | |
| VALUE | varchar(255) | |

Mobile Platforms

There are 6 screens conceptualized for the phone application: Home/Activation Screen; Neighborhood Event List Screen, Video View Screen, Video sensors Screen, Configuration Screen, Video sensor Setup Screen. While there are many ways to display the information on a mobile platform, the following is but one description.

Neighborhood/Home Screen

This screen is the home screen displayed whenever the application is not started from a notification. If we have a notification of an alarm then we start up with Neighborhood Event List screen. The Home Screen lists each Neighborhood that has an Unattended Triggered Video Event on it regardless of role; Each Neighborhood may be highlighted in some way if there has been an event, e.g. a flashing icon, or a colour change Each Neighborhood will display a status showing the combined status of the attached video sensors.

There will be five possible states. Either all the video sensors can be on or off or there may be a combination of on and off video sensors. The shown states will be: ON—All video sensors are on (active), TURN_ON—If any video sensors are in the 'turn on' state then the service returns this state until all video sensors are in either the ON state or OFF state (i.e. SOME or ON); SOME—at least one video sensor is in a state that doesn't match any of the other video sensors. All the video sensor states being either on, off or turn_off, but none set to turn on; OFF—all video sensors have a state of off or turn_off; Since a turn off notification is only read by a video sensor when it checks in, when it is on it will only check-in when it is activated so we don't show the turn off progress.

Each Neighborhood to which the user has the Posse role will only be displayed if there is an Unattended event. In this case my only option is to go to the Neighborhood Event List Neighborhood Name [->Neighborhood Event List Screen].

Event List Screen

This is a list of events that have occurred at selected Neighborhood sorted by time stamp. There can be different types of events: a video event which links to the Video View screen, an activation/deactivation event (i.e. a log of when the camera/location was activated/deactivated), a community log event—a text entry from someone in the Neighborhood's community, e.g. "I've been to the house, window has been broken, I have called the police", a capture video request event—someone has requested a capture on this video sensor, a non-video trigger event (e.g. PIR or reed switch device with no video sensor). Sheriffs have the ability to Dismiss the event. Dismissed events will change state to 'attended', they should be dimmed and should no longer be viewable. Likely would be followed by a text entry log that says e.g. "False Alarm."

Triggered/Requested in entries above is text that indicates whether the video sensor event was from a PIR trigger (i.e. an alarm) or was requested. Events have a state, unattended|attended|trashed. All new events are in the unattended state. A Sheriff can 'dismiss' an event and this will place it in the attended state. Attended state events are still visible. Via the Web Presence view a Sheriff can place an event in the trashed state in which case it is no longer visible and may be deleted from the sever side tables either immediately or as part of some maintenance. When a Sheriff or Deputy makes a location inactive every event on the event list prior to that timestamp is placed in the attended state.

Video View Screen: Plays the selected video. Normal video stream controls, back forward, play pause etc (depending on what the user device API supports). Text on screen displays Neighborhood, Video sensor Name and Date-time of event. Navigation/Actions from this screen are: Call police (number called is obtained from account database), Return to Neighborhood Event List, Play next Video sensor Event (older in time), Play previous Video sensor Event (earlier in time), Capture Now (run a new capture on this video sensor).

Video sensors Screen: Displays a list of video sensors (in the Neighborhood). It might look like: Video sensor Id-Video sensor Name [->On/Off] [Capture Now]. The "On/Off" indication will be an icon of three states, ON, ANIMATED_ON, OFF. That is one state will indicate that the video sensor is on, another will indicate via animation that the video sensor has been set to turn on during the next check-in by the video sensor and finally a display to indicate that the video sensor is off. Since a turn off notification is only read by the video sensor when it checks in and when it is on it will only check-in when it is activated we don't show the turn off progress. Video sensor Name is typically a user-defined name that captures the video sensor's position, e.g. "Garage", "Driveway", "Lounge Room" (see database schema). An entry may be marked in some way (e.g. colour) to indicate if it has a privacy flag set. Privacy flags are set in the administration section of the Web Presence.

OAuth Security: The API for Mobile Platform Apps is authenticated and secured by OAuth 1.0a. Any OAuth client must know of a few URLs in order to complete the OAuth sign-in process. For the Vardr API, these are: Request Token URL—/oauth/request_token; Access Token URL—/oauth/access_token; Authorization URL—/oauth/authorize. Traditionally, the Request Token URL and Access Token URL are accessed by an application programmatically, whereas the Authorization URL is used by to navigate the user's browser to a user-facing web page. This web page allows the user to log in and then authorize the consumer application.

Interpretation

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Although the present invention has been described with particular reference to certain preferred embodiments thereof, variations and modifications of the present invention can be effected within the spirit and scope of the following claims.

I claim:

1. A system comprising:
    a processing server to receive video from a plurality of video sensors monitoring an environment and streaming video into the system;
    a database to store accounts for a plurality of system users collectively monitoring the video streams, the users generating events in relation to the video streams, the system users being divided into a number of predetermined roles with each role having differing predetermined levels of access to the system, a first role including the ability to add and delete new users to the system with particular roles and a second role including the ability to log events to report among the system users but not an ability to add and delete new users; and
    a reporting system for reporting actions including logged events taken by the system users among the system users.

2. A system as claimed in claim 1 wherein the environment comprises a neighborhood having a geographic spatial area.

3. A system as claimed in claim 1 wherein the environment comprises one or more video sensors.

4. A system as claimed in claim 1 wherein the first role includes the ability to add and delete new video sensors to the system.

5. A system as claimed in claim 1 further comprising an event log to store a log of the actions taken by the system users and wherein the first role includes the ability to delete events generated in relation to the video streams.

6. A system as claimed in claim 1 wherein the system includes an authorization access unit for approving access to the system by the system users and the authorization access unit allows streamlined access for users authorized to access other predetermined social networking systems.

7. A system as claimed in claim 1 wherein the reporting system sends notifications to users on the occurrence of predetermined events.

8. A system as claimed in claim 7 wherein the notifications include at least one of email, SMS, Mobile Push Notifications, Facebook or Twitter notifications.

9. A system for monitoring an environment, the system comprising:
 a series of network connected video sensors monitoring various events in the environment; and
 a monitoring application interconnected to the video sensors and running on the network for the monitoring of the video sensors by a collection of users, the monitoring application including an event log for monitoring by the users of events occurring in the environment and for providing real time interaction through user comments in relation thereto, the event log receiving events and comments from the users, the users being divided into a number of predetermined roles with each role having differing predetermined levels of access to the event log, a first role including the ability to add and delete new users with particular roles and a second role including the ability to log events to the event log but not an ability to add and delete new users.

10. A system as claimed in claim 9 wherein the monitoring application further includes authenticating the collection of users before allowing users to access the event log.

11. A system as claimed in claim 9 wherein each role has different access privileges to the event log.

12. The system as claimed in claim 11 wherein the different access privileges include a highest level of access including the ability to add and delete new users to the system and a lowest level of access including the ability to log events to report among the system users.

13. The system as claimed in claim 9 further comprising a reporting system for reporting events in the event log among the system users.

14. A method comprising:
 receiving video from a plurality of video sensors monitoring an environment at a processing server of a social networking system;
 storing accounts in a database of the social networking system for a plurality of system users collectively monitoring the received video streams and generating events in relation to the received video streams, the system users being divided in the database into a number of predetermined roles with each role having differing levels of access to the system,
 allowing system users with the highest level of access to add and delete new users to the system and to determine roles of other users;
 allowing system users with the lowest level of access to log events to report among the system users; and
 reporting actions including events logged by the system users among the system users by a reporting system of the social networking system.

15. The method of claim 14 further comprising allowing system users with an intermediate level of access between the highest and the lowest level to delete events generated in relation to the received video streams.

16. The method of claim 14 further comprising providing real time interaction through user comments in the form of logged events.

17. The method of claim 14,
 wherein one system user with the highest level of system access is an owner of the monitored environment, the method further comprising:
 inviting system users to join a community of system users for the monitored environment, the invitation including a predetermined role;
 receiving a confirmation from the invited system user in response to the invitation; and
 reporting actions of other system users in the community to the invited system user.

18. The method of claim 17, further comprising:
 establishing a user account in the system by the invited system user and receiving an indication from the user of how actions are to be reported to the invited system user.

19. The method of claim 14, wherein the system has a plurality of environments, wherein each user account includes an indication of the environments for which the respective user has access, wherein each environment has a system user designated as an owner in the respective user account, wherein the owner has an ability to add and delete system users from access to the respective environment.

20. An apparatus comprising:
 means for receiving video from a plurality of video sensors monitoring an environment at a system;
 means for storing accounts in the system for a plurality of system users collectively monitoring the received video streams and generating events in relation to the received video streams, the system users being divided into a number of predetermined roles with each role having differing levels of access to the system,
 means for allowing system users with the highest level of access to add and delete new users to the system and to determine roles of other users;
 means for allowing system users with the lowest level of access to log events to report among the system users; and
 means for reporting actions including events logged by the system users among the system users by a reporting system of the social networking system.

* * * * *